(12) United States Patent
Nemoto

(10) Patent No.: US 6,710,925 B2
(45) Date of Patent: Mar. 23, 2004

(54) LENS ARRAY OF ERECTING MODE WITH UNITY MAGNIFICATION

(75) Inventor: Hiroyuki Nemoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/458,542

(22) Filed: Jun. 10, 2003

(65) Prior Publication Data

US 2003/0231402 A1 Dec. 18, 2003

(30) Foreign Application Priority Data

Jun. 12, 2002 (JP) ........................................ 2002-170955
Jan. 9, 2003 (JP) ........................................ 2003-003360

(51) Int. Cl.$^7$ ............................................. G20B 27/10
(52) U.S. Cl. ........................................ 359/621; 359/619
(58) Field of Search ................................ 359/621, 619, 359/624, 623, 622

(56) References Cited

U.S. PATENT DOCUMENTS 6,124,975 A * 9/2000 Dona et al. .................. 359/626
6,377,403 B1 * 4/2002 Smith .......................... 359/667

\* cited by examiner

Primary Examiner—Hung X. Dang
(74) Attorney, Agent, or Firm—RatnerPrestia

(57) ABSTRACT

A lens array of an erecting mode with unity amplification which scarcely generates a stray light and a flare light, is provided. In the lens array of the erecting mode with unity amplification constituted by superposing a plurality of lens plates in which convex lenses are arrayed and formed on both sides, a lens pitch P of the array direction of the convex lenses is not less than two times the height of an inverted image formed inside the lens array of the erecting mode with unity amplification, and an aperture diaphragm is provided on individual lens elements in a position in which the inverted image is formed so that a light does not pass through the outside of the region of a circle having the height of the inverted image as a radius.

15 Claims, 6 Drawing Sheets

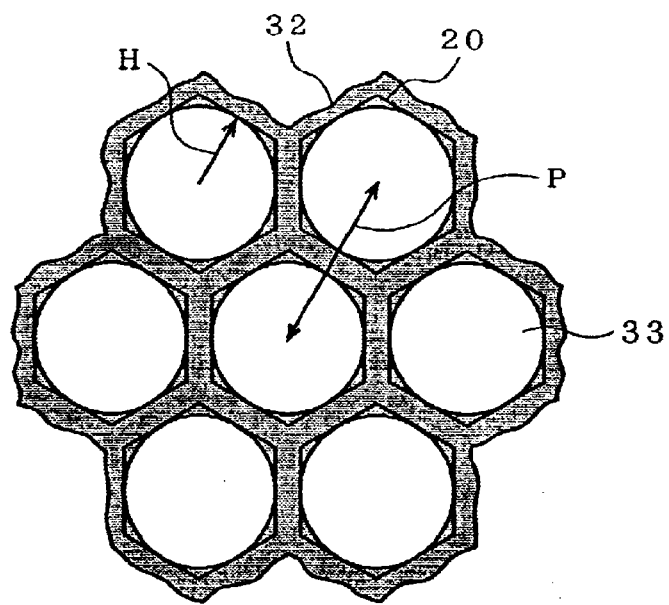
F I G. 4
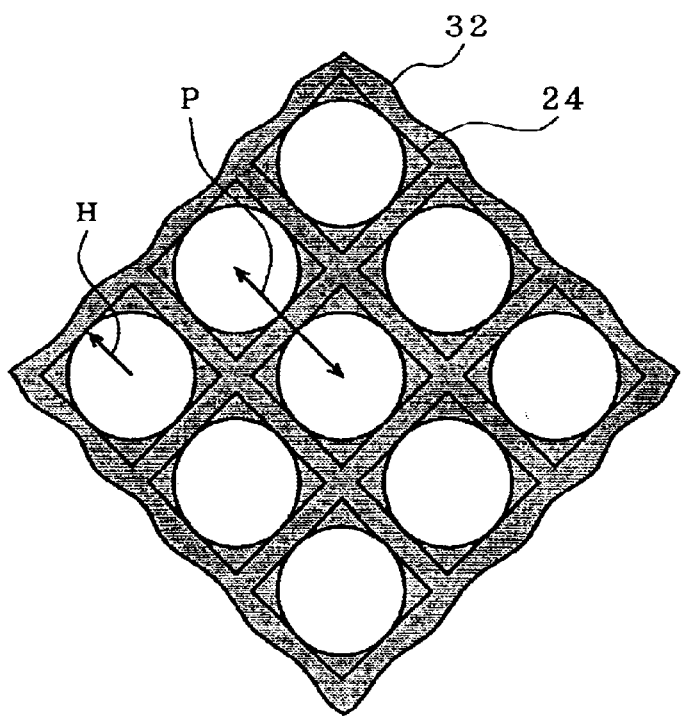
F I G. 5

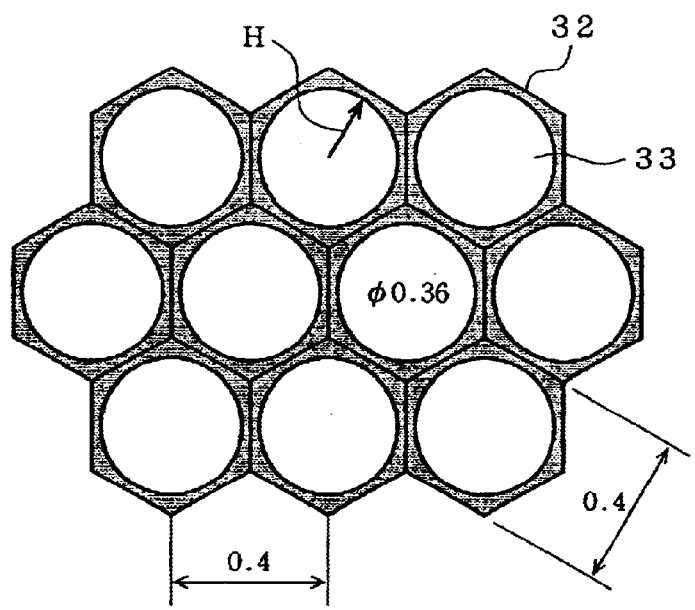
F I G. 6
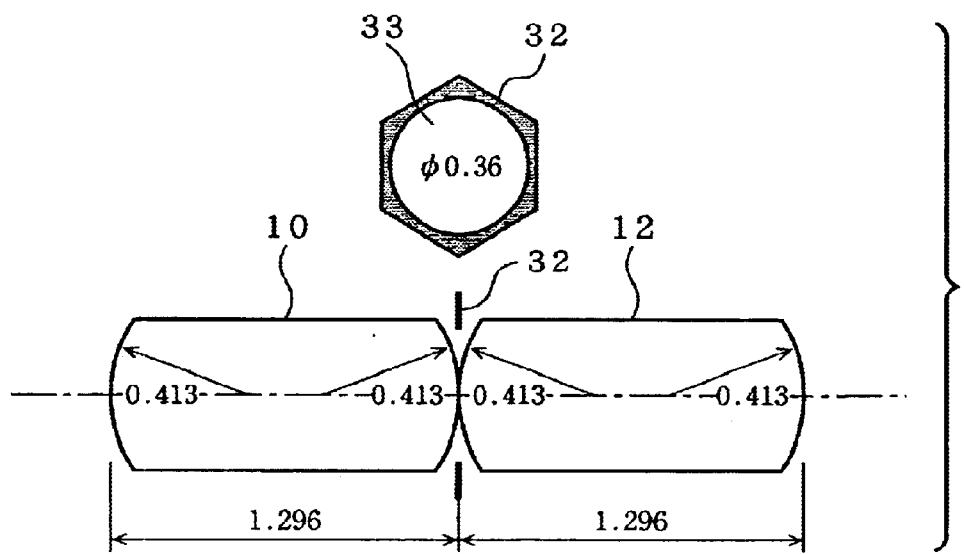
F I G. 7

LENS ARRAY OF ERECTING MODE WITH UNITY MAGNIFICATION

BACKGROUND OF THE INVENTION

1. Field of the Invention

The present invention relates to a lens array of an erecting mode with unity amplification and, more particularly, to a lens array of an erecting mode with unity amplification, which provides an aperture diaphragm and prevents a flare light and a stray light.

2. Description of the Prior Art

A lens array of an erecting mode with unity amplification is realized by superposing a plurality of lens plates, which array a number of convex lenses on both sides thereof. For example, a plurality of resin lens plates, which array a number of convex lenses on both sides of a transparent substrate, is superposed so as to form a resin lens array of the erecting mode with unity magnification.

An optical system of the erecting mode with unity magnification assumes that the height of an object is equal to the height of an erecting image. It is, thus, subject to the condition that the optical system between the object and the erecting image is symmetric, and an inverted image needs to be formed in the center of a lens plate group. In the case where the number of lenses is in even numbers, the inverted image is formed between two pieces of the lens plates at the center, and in the case where the number of lenses is in odd numbers, at the central position of the lens plate at the center, and a light ray becomes symmetrical for this inverted image.

FIG. 1 shows a state of the light ray in which an image of the erecting mode with unity magnification is obtained by tightly superposing two pieces of the lens plates 10 and 12 in which convex lenses 8 are arrayed and formed on both sides. In the drawing, reference numeral 2 denotes the object, and 4 the Image. In this case, the inverted image 16 is formed on the surface 14 to which the lens plates 10 and 12 come into contact.

Since the lens plate can be manufactured by a forming, a mass production Is easy and, since the lens plate is light in weight and moderate in price, it is used for various applications. In particular, applications for image forming apparatuses such as optical printers and the like or image reading apparatuses such as scanners and the like are expected. Although a much higher resolution is required for these apparatuses, the resin lens by a forming can obtain a high degree of accuracy since an accuracy of the lens array is decided by the accuracy of a forming die. Moreover, the resin lens by forming is characterized by the very rare existence of characteristic unevenness between individual lens arrays.

The resin lens array of the erecting mode with unity magnification as described above has the following problems.

(1) Since the lens plate is transparent, the portion other than the lens portion is transparent. Hence, a light shielding is required for the light that transmits the portion other than the lens portion, and a shielding layer is thus provided. However, even if the shielding layer is provided, there is such a case that the light incident on the lens portion becomes the flare light and the stray light for adjacent lenses.

(2) When the area of the shielding layer is enlarged to prevent the flare light and the stray light, the amount of transmitted light is reduced.

The above-described problems will be described more in detail in relation to a compact lens array structure. As an ordinary compact lens array structure, there exist a six directional compact array structure and a four directional compact array structure. FIG. 2A shows one piece of a lens 20 in the case of the six directional compact lens arrays. Although the actual lens shape of this lens is an equilateral hexagon, the lens diameter can be regarded as the diameter of an inscribed circle 22 of the equilateral hexagon. FIG. 2B shows one piece of a lens 24 in the case of the four directional compact array structures. The actual lens shape of this lens is a square, and the lens diameter can be regarded as the diameter of an inscribed circle 26 of the square.

Continuing with FIGS. 1 and 2A and 2B, the inverted image 16 needs to be formed within the scope of the inscribed circles 22 and 26. The height of the inverted image is theoretically found to satisfy a required specification of a desired resolution and the amount of transmitted light. In this way, the size of the actual lens is designed. Although the height of the inverted image changes depending on the design of the optical system, the maximum value of the height of the inverted image needs to be within a lens radius (radius of the inscribed circle of the actual lens shape). When the height of the inverted image becomes higher than the lens radius, the part of the inverted image hangs over the adjacent lenses so that no correct image formation can be made.

It is possible to design the optical system so that the height of the inverted image becomes lower than the lens radius. In general, the outer periphery of the lens has a large aberration and, therefore, It is desirable to design the height of the inverted image slightly lower than the lens radius. However, when the height of the inverted image is low, the amount of transmitted light is reduced and the image becomes dark. Therefore, it is necessary to design the optical system by considering a balance between both factors. On the other hand, the height of an object 2 needs not to be equal to the lens radius, and if it is within the scope in which the light can be taken in, regardless of whether it is higher or lower than the lens radius, it can be selected by the design of the optical system.

Returning to FIGS. 2A and 2B, the light which passes through within the real lens region of the outside of the inscribed circles 22 and 26 becomes the flare light. Further, the light which passes through within a virtual lens radius equivalent to the radius of the inscribed circles 28 and 30 of the real lens becomes the stray light at the outside of the real lens region.

FIGS. 3A and 3B show the lens plates, which are constituted by a six directional compact array, or a four directional compact array in which such real lenses mutually come into contact. Note that the array direction of the real lens is defined as follows. That is, the direction, in which one side of the shape of a polygonal real lens comes into contact with each other, is regarded as the array direction. Hence, it is clear that there are the six directional array directions in FIG. 3A, and the four directional array directions in FIG. 3B.

In the lens array of the erecting mode with unity amplification constituted by superposing a plurality of lens plates shown in FIGS. 3A and 3B, when the inverted image formed by a pair of lens enters the real lens region of the outside of the inscribed circle, it becomes the flare light. When it enters within the virtual lens radius outside of the real lens region, it becomes the stray light. To prevent these phenomena, when the shielding layer is provided in the boundary of the real lens so as to form the aperture diaphragm therein, the lens area, through which the inverted image can transmit, is decreased and the amount of transmitted light is reduced.

Further, when there is unevenness in the width or the position of the shielding layer, it tends to cause an uneven light intensity. The image forming apparatus or the image reading apparatus using such a lens array of the erecting mode with unity magnification generate the uneven light intensity due to the flare light and the stray light.

SUMMARY OF THE INVENTION

An object of the present invention is to provide a lens array of an erecting mode with unity amplification, which scarcely generates a stray light and a flare light.

In the lens array of the erecting mode with unity magnification of the present invention, which is constituted by superposing a plurality of lens plates in which convex lenses are arrayed and formed on both surfaces, a lens pitch in the array direction of the convex lens is not less than two times the height of the inverted image formed inside the lens array of the erecting mode with unity amplification, and an aperture diaphragm is provided on individual lens elements in the surface adjacent to the position in which the inverted image is formed, so that a light does not pass through the outside of the area of a circle having the height of the inverted image as a radius. In this case, when the number of the lens plates is in even numbers, the aperture diaphragm is provided between two pieces of the lens plates in which the inverted image is formed.

Further, when the number of lens plates is in odd numbers, the aperture diaphragm is provided inside the central lens plate, inside of which the inverted image is formed. The central lens plate is constituted such that two pieces of single-faced lens plates, in which convex lenses are formed on one side, allow the surfaces, in which no convex lenses are formed, to be opposed and superposed, and the aperture diaphragm is provided on the superposed surfaces of two pieces of the single-faced lens plates. Further, when the number of lens plates is in odd numbers, the aperture diaphragm is provided between the central lens plate, inside of which the inverted image is formed, and the lens plates of both sides in opposition to the central lens plate.

The aperture diaphragm can be formed of a film-shielding layer or the shielding layer adhered to the surface of the lens plate.

BRIEF DESCRIPTION OF THE DRAWINGS

FIG. 4 is a view showing a lens array of the erecting mode with unity amplification of a six directional compact array structure, which is one embodiment of the present invention;

FIG. 5 is a view showing the lens array of the erecting mode with unity amplification of a four directional compact array structure, which is one embodiment of the present invention;

FIG. 6 is a view showing a practical design example of an aperture diaphragm;

FIG. 7 is a view showing the practical design example of the lens array of the erecting mode with unity amplification by using the aperture diaphragm shown in FIG. 6;

DESCRIPTION OF THE EXAMPLARY EMBODIMENT

FIGS. 4 and 5 show a lens array of an erecting mode with unity amplification of a six directional compact array structure and a four directional compact array structure, which is one embodiment of the present invention. In this example, a lens pitch P of the array direction of lenses 20 and 24 is set to be not less than two times a height H of an inverted image. Moreover, a shielding layer for shielding the outside of a circle having the height H of the inverted image as a radius is provided, and an aperture diaphragm 32 is formed. In FIGS. 4 and 5, a circle portion shows an opening 33 of the aperture diaphragm. Note that, in the embodiment shown in FIGS. 4 and 5, the height H of the inverted image is equal to a lens radius. Usually, the height of the inverted image is designed to be slightly lower than the lens radius.

Such an aperture diaphragm is either held between lens plates as a piece of film shielding layer or is formed by adhering the shielding layer on a lens surface. The film shielding layer can be either the one in which an opening is formed by printing a light absorption layer on a film surface having a high light transmittance or the one in which the opening is formed by providing a hole on the film having a low light transmittance.

The aperture diaphragm needs not to be provided by corresponding to all the lens plates, and may be provided at least at a position in which the inverted image is formed. In this case, the aperture diaphragm is either formed by holding the film shielding layer between the lens plates or is formed by adhering the shielding layer at least on one of the opposed lens surfaces.

A practical design example of such an aperture diaphragm is shown in FIG. 6. FIG. 6 shows a film aperture diaphragm 32 used in the lens array of the erecting mode with unity magnification having the six directional array structures. The height H of the inverted image is 0.18 mm. Therefore, a radius of one piece of the circular opening 33 is 0.36 mm. The lens pitch is 0.4 mm, not less than two times the height H of the inverted image. Note that, in FIG. 6, a solid line showing a hexagonal shape shows a region of the shielding layer, which forms one piece of the circular opening 33.

Figure 1:
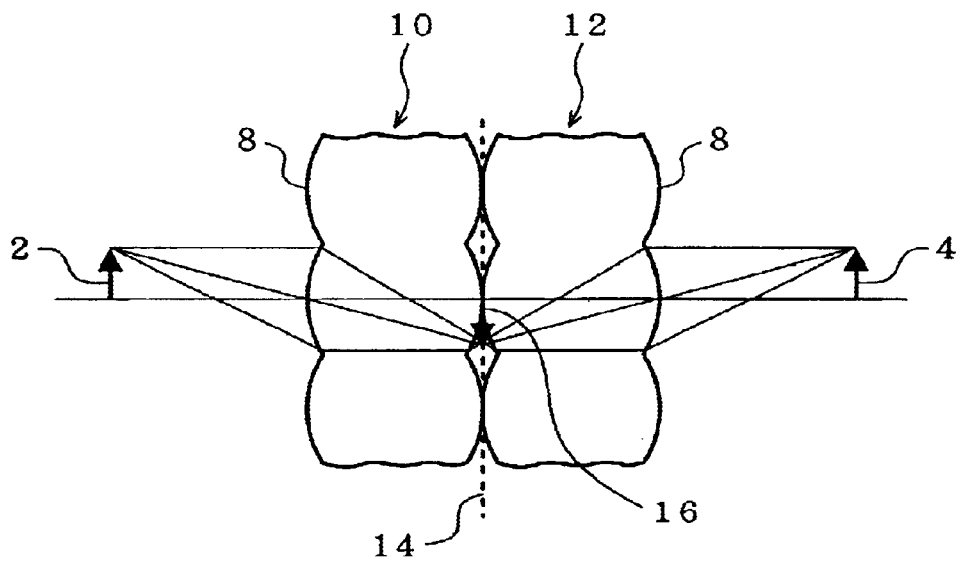
FIG. 1 is a view showing a state of the light in the case where an image of an erecting mode with unity magnification is obtained by superposing two pieces of lens plates.
Figures 2A, 2B:
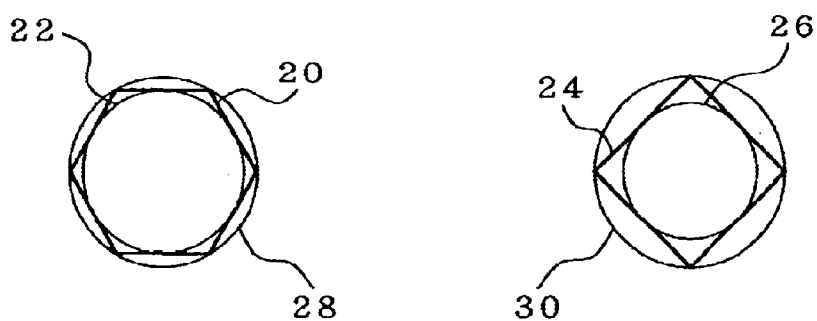
FIG. 2A is a view showing a lens radius and a virtual lens radius of one piece of a lens in a six directional compact array structure.
FIG. 2B is a view showing the lens radius and the virtual lens radius of one piece of the lens in a four directional compact array structure.
Figure 3A:
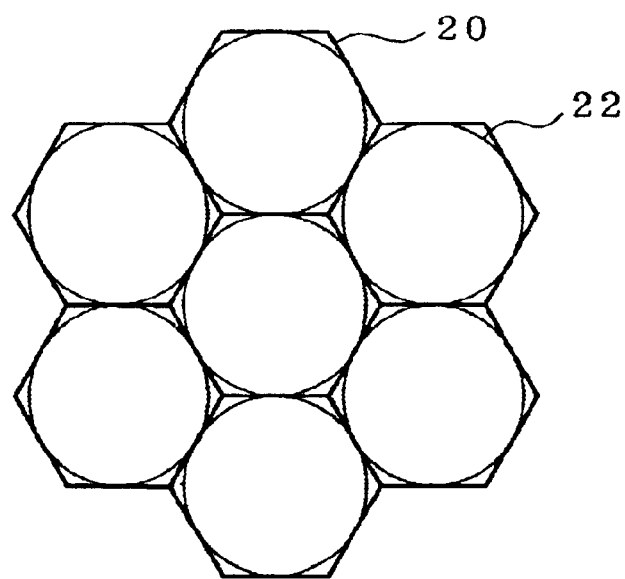
FIG. 3A is a view showing the lens plates arrayed and constituted by the six directional compact arrays so that the lenses mutually come into contact.
Figure 3B:
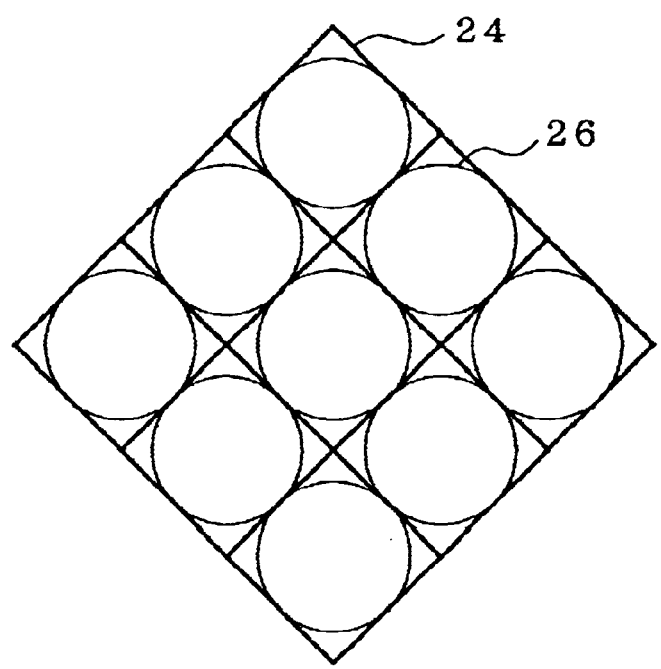
FIG. 3B is a view showing the lens plates arrayed and constituted by the four directional compact arrays so that the lenses mutually come into contact.

FIG. 7 shows an example in which the film aperture diaphragm 32 shown in FIG. 6 is provided in the lens array of the erecting mode with unity amplification shown in FIG. 1 to be held between two pieces of the lens plates 10 and 12 in the lens array of the erecting mode with unity magnification shown in FIG. 1. This is an optical system in which 60% of a MTF (Modulation Transfer Function) is obtained by a special frequency 4LP/mm. Note that the MFT is represented by the following expression:

$$MTF = \frac{i(w)_{max} - i(w)_{min}}{i(w)_{max} + i(w)_{min}} \times 100 \ (\%)$$

where $i(W)_{max}$ and $i(W)_{min}$ show the maximum value and the minimum value of a rectangular wave response in the special frequency w(Lp/mm). When the MTF is as close as to 100%, it shows that an image faithful to an original picture is formed.

Note that, in FIG. 7, to simplify the drawing, two pieces of the lens plates 10 and 12 show only a portion including one piece of a convex lens. Further, a top view of the shielding layer 32, which forms one piece of the circular opening 33, is shown together.

Thickness of each lens plate is 1.296 mm, and a curvature radius of the convex lens, which each lens plate possesses, is 0.413 mm. The lens pitch of the array direction of the convex lens is 0.4 mm.

In such a lens array of the erecting mode with unity amplification, the aperture diaphragm is provided at a forming position of the inverted image. Thus, it is possible to reduce a flare light and a stray light.

Figure 8:
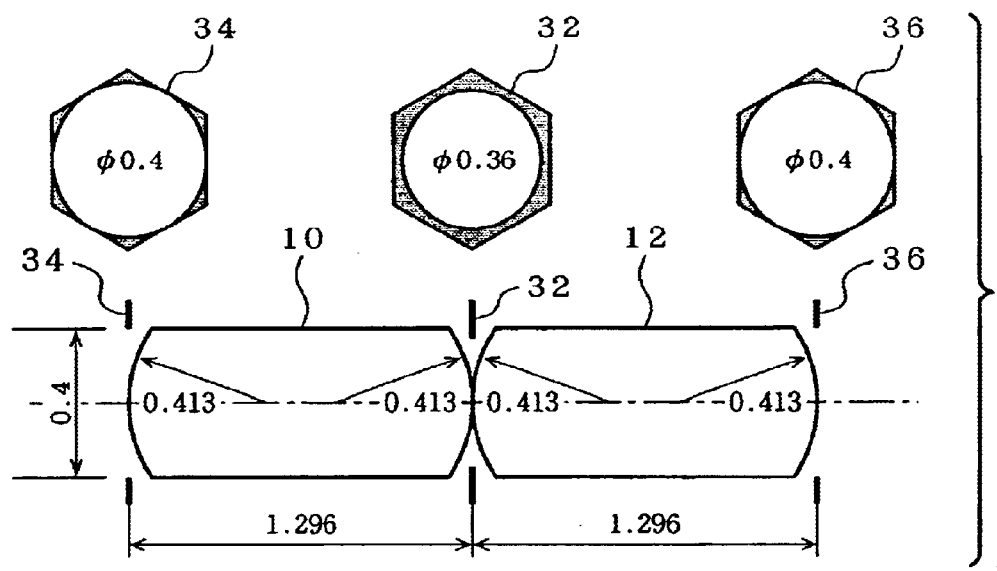
FIG. 8 is a view showing another practical design example of the lens array of the erecting mode with unity amplification by using the aperture diaphragm shown in FIG. 6.

Furthermore, in the case where the flare light and the stray light are desired to be reduced, it is most effective if the aperture diaphragm is provided at the forefront of the lens plate at an object side and at the rearmost surface of the lens plate at the image side. FIG. 8 is an example in which the film aperture diaphragms 34 and 36 are provided at the forefront and the rearmost surface of the lens plates 10 and 12 of the lens array of the erecting mode with unity amplification shown in FIG. 7. The diameter of the aperture diaphragms 34 and 36 is 0.4 mm, and is set to be slightly larger than the diameter of the aperture diaphragm 32 provided between the lens plates 10 and 12.

The above-described examples relate to the case where the lens plates are superposed two pieces. When the lens plates are superposed in even numbers (not less than four pieces), the inverted image is formed between two pieces of the central lens plates. Therefore, it is possible to provide the film aperture diaphragm so as to be held between two pieces of the lens plates. Further, as shown in FIG. 8, the film aperture diaphragms are provided at the forefront and the rearmost surface of the lens plate, thereby making it possible to further reduce the stray light.

However, when the lens plates are superposed in odd numbers, the inverted image is formed inside the central lens plate. In this case, the aperture diaphragm is either provided inside the central lens plate or is provided between the central lens plate and lens plates of both sides in opposition to the central lens plate.

Figure 9:
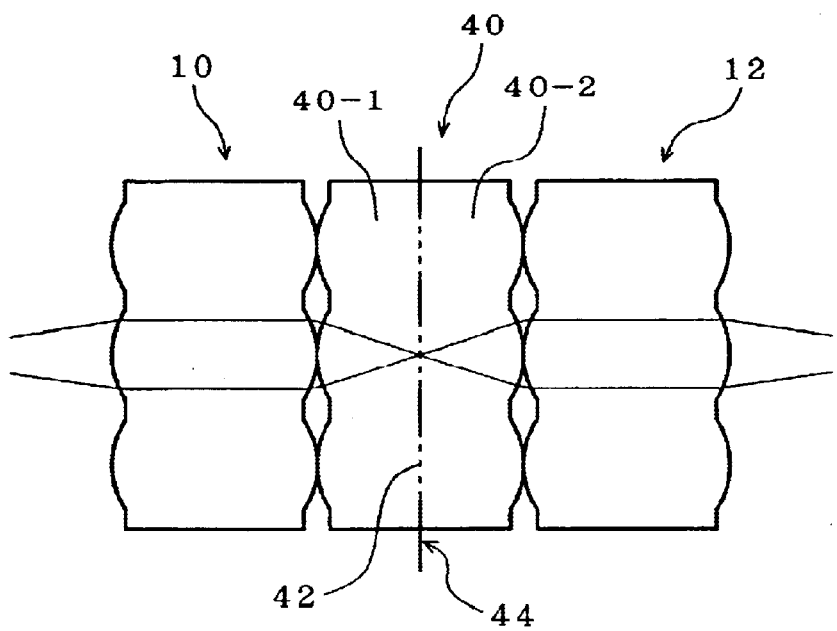
FIG. 9 is a view showing an example in which the aperture diaphragm is provided inside a central lens plate of the lens array of the erecting mode with unity amplification.

FIG. 9 is an example in which the aperture diaphragm is provided inside the central lens plate of the lens array of the erecting mode with unity amplification constituted by superposing three pieces of lens plates 10, 40 and 12. The central lens plate 40 is constituted by adhering another side of the single-faced lens plate 40-1 and 40-2 where no lenses are formed. In the drawing, reference numeral 42 denotes the adhered surfaces. In this case, the aperture diaphragm is provided on the adhered surfaces by holding the film aperture diaphragm 44. The radius of the circular opening of the film aperture diaphragm 44 is constituted so as to be equal to the height of the inverted image.

Figure 10:
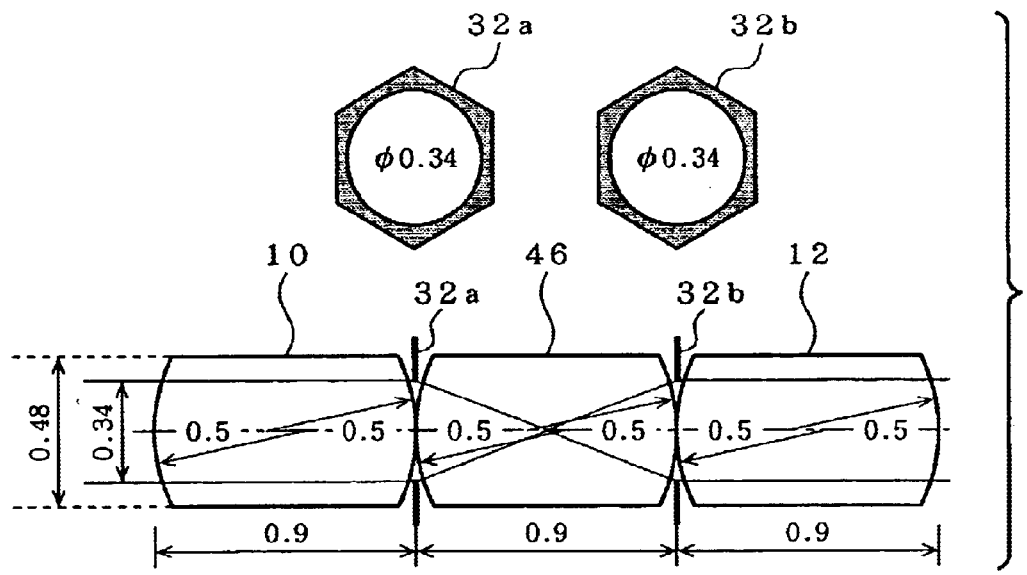
FIG. 10 is a view showing the example in which the aperture diaphragm is provided between the central lens plate of the lens array of the erecting mode with unity amplification and the lens plates of both side in opposition to the central lens plate.

FIG. 10 shows an example in which the aperture diaphragms are provided between the central lens plate 46 of the lens array of the erecting mode with unity amplification constituted by superposing three pieces of lens plates 10, 46 and 12, and the lens plates 10 and 12 in opposition to the central lens plate 46, respectively. The aperture diaphragm is formed by holding one piece of the film shielding layer between the lens plates.

Continuing with FIG. 10, to simplify the drawing, three pieces of the lens plates 10, 46, 12 show the portion that includes only one piece of the convex lens. The thickness of each lens plates is 0.9 mm, and the curvature radius of the convex lens each lens plate possesses is 0.5 mm. The lens pitch of the convex lenses to the array direction is 0.48 mm. An aperture diaphragm 32a is provided between the lens plate 46 and the lens plate 10, and an aperture diaphragm 32b is provided between the lens plate 46 and the lens plate 12. The radius of the circular opening of the aperture diaphragms 32a and 32b is 0.34 mm, and it is constituted to be equal to the height of the inverted image.

Figure 11:
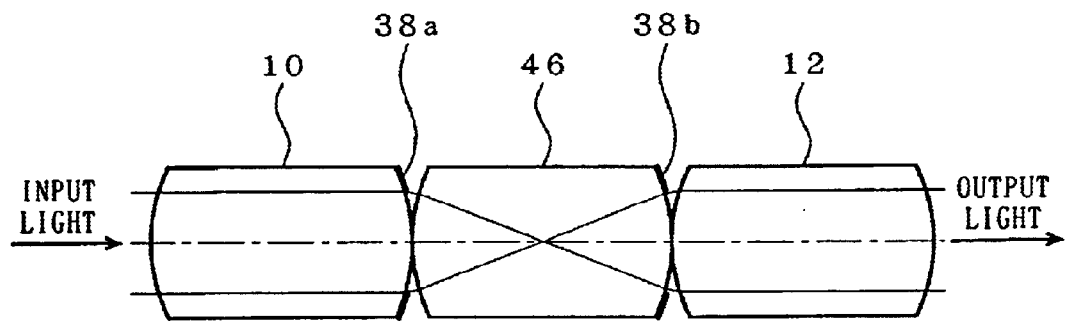
FIG. 11 is a view showing the example in which the aperture diaphragm is provided between the central lens plate and the lens plates of both sides in opposition to the central lens plate by adhering a shielding layer on the lens surface.

In FIG. 10, though the aperture diaphragm according to the present invention uses a film type to be held between the lens plates, the aperture diaphragm may be formed by adhering the shielding layer on the lens surface. FIG. 11 shows an example in which, by adhering the shielding layer on the lens surfaces, the aperture diaphragms 38a and 38b are provided between the central lens plate 46, and the lens plates 10 and 12 of both sides in opposition to the central lens plate 46. In this case, it is desirable that, in the light incident side of the central lens plate 46, the aperture diaphragm 38a is formed on the lens forming surface of the opposing lens plate 10 and, in the light outgoing side, the aperture diaphragm 38b is formed on the lens forming surface of the central lens plate 46.

In the lens array of the erecting mode with unity amplification, in which pieces of lens plates in odd numbers are superposed, when the flare light and the stray light are to be further reduced, as described in FIG. 8, the film aperture diaphragms can be provided on the forefront of the lens plate at the object side and on the rearmost surf ace of the lens plate at the image side.

According to the present invention, the following advantages can be obtained.

(1) Since the light, which forms the image, is prevented from being incident on the adjacent lens, the stray light and the flare light can be effectively prevented.

(2) Since the stray light and the flare light are prevented, there is no need to provide the aperture diaphragm inside the lens radius as with the conventional case.

(3) Since the aperture diaphragm is not provided as with the conventional case, uneven light intensity is scarcely caused by unevenness in the size and position of the aperture diaphragm.

What is claimed is:

1. A lens array of an erecting mode with unity amplification, comprising:
 a plurality of superposed lens plates, in which convex lenses are arrayed and formed on both sides of each lens plate, and a lens pitch of the array direction of said convex lenses is not less than two times the height of an inverted image formed inside said lens array of the erecting mode with unity magnification; and
 an aperture diaphragm provided in individual lens element on the surface in the vicinity of a position, in which said inverted image is formed so that a light does not pass through the outside of a circle having the height of said inverted image as an radius.

2. The lens array of the erecting mode with unity amplification according to claim 1, wherein said aperture diaphragm is provided between two pieces of lens plates, in which said inverted image is formed, when said plurality of lens plates is in even numbers.

3. The lens array of the erecting mode with unity amplification according to claim 2, wherein said aperture diaphragm is formed by a film shielding layer held between said two pieces of lens plates.

4. The lens array of the erecting mode with unity amplification according to claim 2, wherein said aperture diaphragm is formed by the shielding layer adhered at least on one lens formation surface of the lens formation surfaces, which are opposed between said two pieces of lens plates.

5. The lens array of the erecting mode with unity amplification according to any one of claims 1 to 4, wherein said plurality of lens arrays is comprised from two pieces.

6. The lens array of the erecting mode with unity amplification according to claim 1, wherein said aperture diaphragm is provided inside a central lens plate inside of which said inverted image is formed when said plurality of lens plates is in odd numbers.

7. The lens array of the erecting mode with unity amplification according to claim 6, wherein said central lens plate is constituted such that two pieces of single lens plates in which one side has convex lenses and another side of the said two pieces of single lens plates in which the convex lenses are not formed is opposed and adhered with each other, wherein said aperture diaphragm is provided on the adhered surfaces of said two pieces of single lens plates.

8. The lens array of the erecting mode with unity amplification according to claim 7, wherein said aperture diaphragm is formed by the film shielding layer held between said two pieces of single lens plates.

9. The lens array of the erecting mode with unity amplification according to claim 7, wherein said aperture diaphragm is formed by the shielding layer adhered at least on one surface of the adhered surfaces between said two pieces of single lens plates.

10. The lens array of the erecting mode with unity amplification according to any one of claims 6 to 9, wherein said plurality of lens plates are consisted of three pieces.

11. The lens array of the erecting mode with unity amplification according to claim 1, wherein said aperture diaphragm is provided between the central lens plate, inside of which said inverted image is formed, and the lens plates located at both sides in opposition to the central lens plate when said plurality of lens plates is in odd numbers.

12. The lens array of the erecting mode with unity amplification according to claim 11, wherein said aperture diaphragm is formed by the film shielding layer held between said central lens plate and the lens plates in opposition to the central lens plate.

13. The lens array of the erecting mode with unity amplification according to claim 11, wherein said aperture diaphragm is formed by the shielding layer adhered at least on one lens formation surface of the lens formation surfaces, which are opposed between said central lens plate and the lens plates in opposition to the central lens plate.

14. The lens array of the erecting mode with unity amplification according to claim 13, wherein said aperture diaphragm is formed on the lens formation surface of opposed lens plates in a light incident side of said central lens plate, and is formed on the lens formation surface of the central lens plate in a light outgoing side of said central lens plate.

15. The lens array of the erecting mode with unity amplification according to claim 11, wherein said plurality of lens plates is consisted of three pieces.

* * * * *

UNITED STATES PATENT AND TRADEMARK OFFICE
CERTIFICATE OF CORRECTION

PATENT NO. : 6,710,925 B2
DATED : March 23, 2004
INVENTOR(S) : Hiroyuki Nemoto

It is certified that error appears in the above-identified patent and that said Letters Patent is hereby corrected as shown below:

Column 1,
Line 36, "object, and 4 the Image" should read -- object, and 4 the image --.
Line 40, "mass productions Is" should read -- mass production is --.

Column 6,
Line 42, "at the object side and on the rearmost surface" should read -- at the object side and on the rearmost surface --.

Signed and Sealed this

Twenty-third Day of November, 2004

JON W. DUDAS
*Director of the United States Patent and Trademark Office*